Dec. 5, 1933.    H. N. AYER ET AL    1,938,130
GREASE DISPENSING DEVICE
Filed April 8, 1933    4 Sheets-Sheet 1
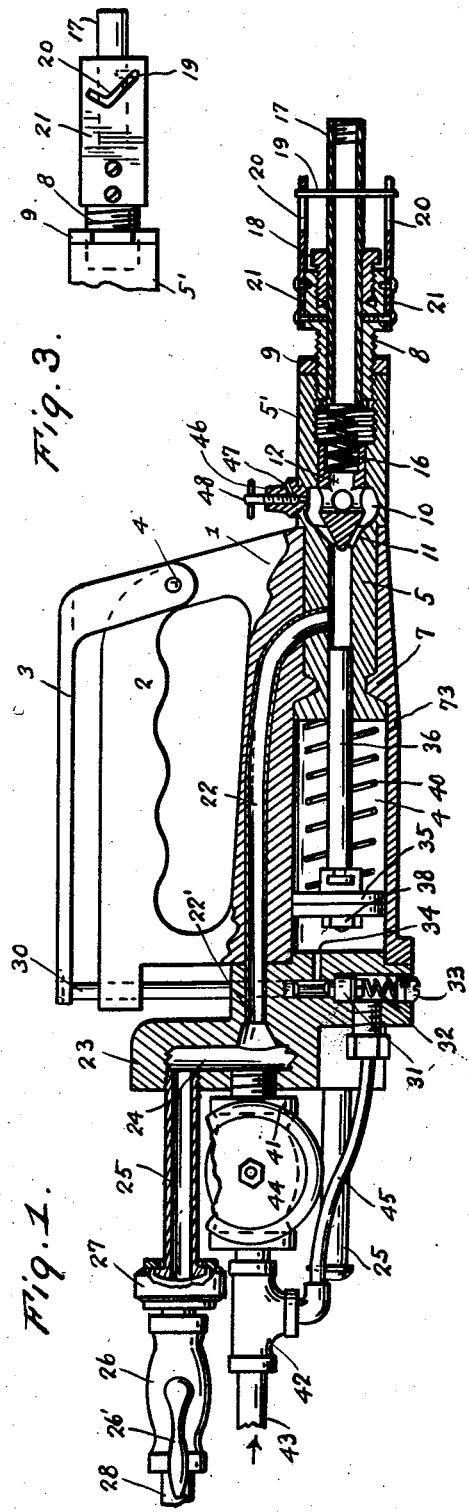
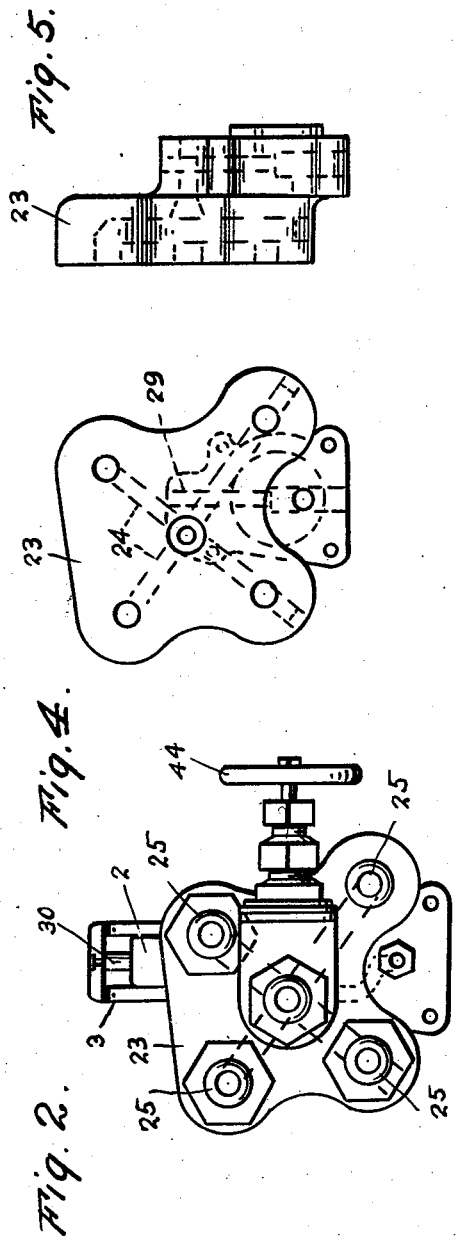
Inventors
H. N. Ayer
J. M. Downing
By Clarence A. O'Brien
Attorney Dec. 5, 1933.    H. N. AYER ET AL    1,938,130
GREASE DISPENSING DEVICE
Filed April 8, 1933    4 Sheets-Sheet 2
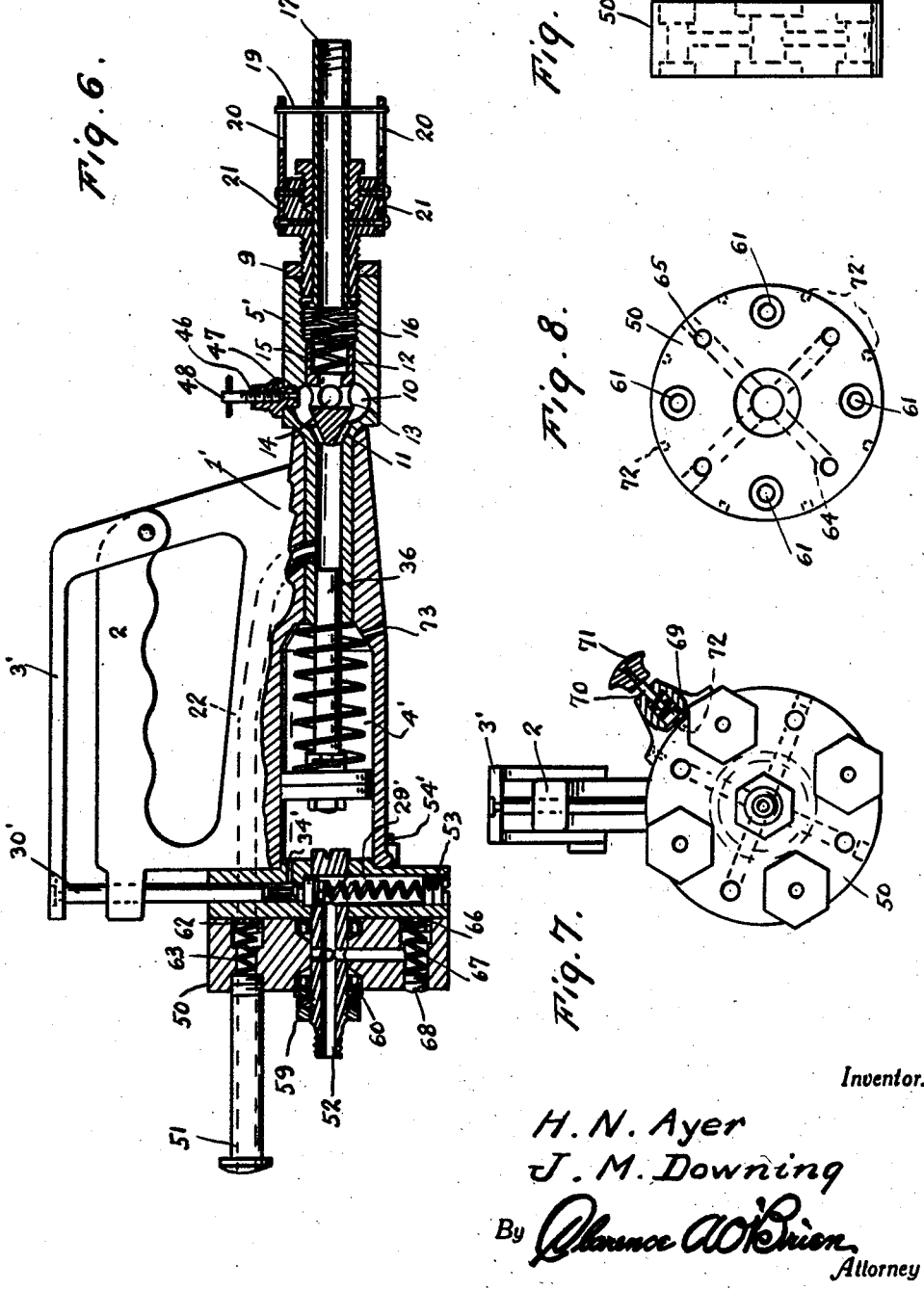
Inventors
H. N. Ayer
J. M. Downing
By Clarence A. O'Brien
Attorney

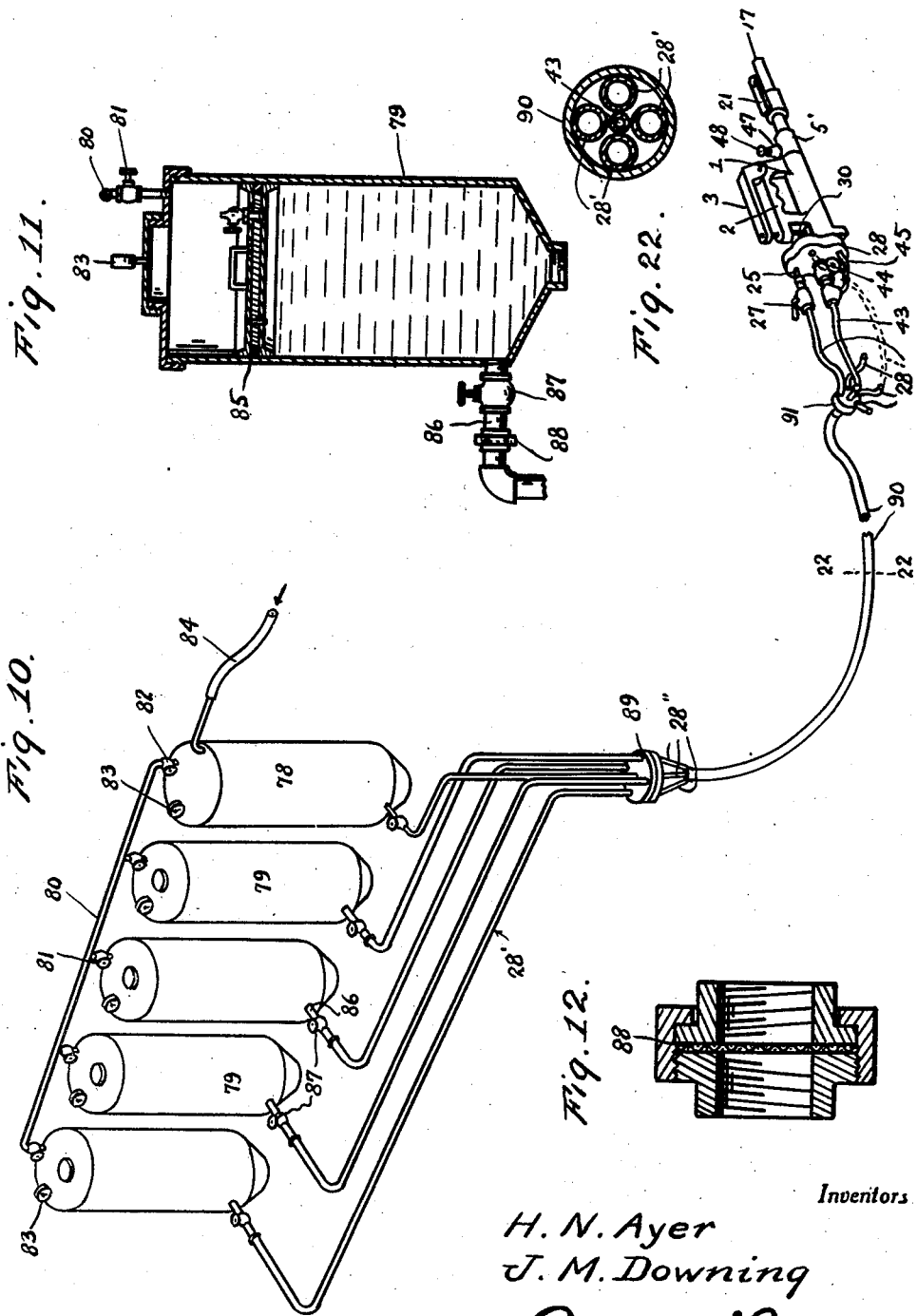

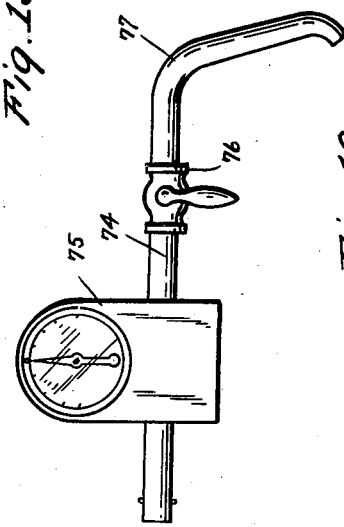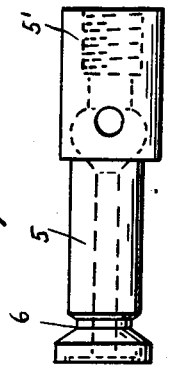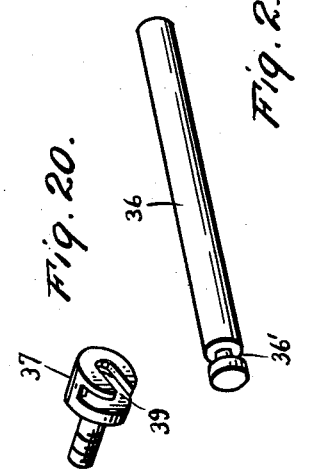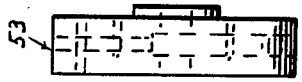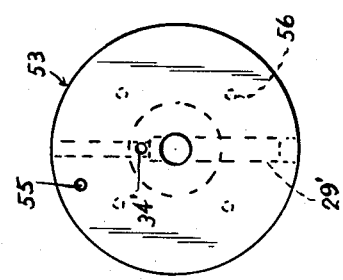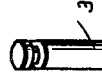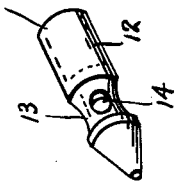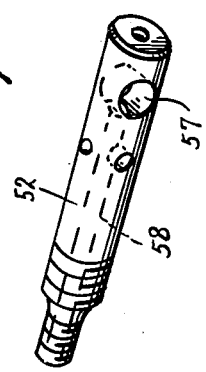

Patented Dec. 5, 1933

1,938,130

UNITED STATES PATENT OFFICE 1,938,130

GREASE DISPENSING DEVICE

Harold N. Ayer and Joseph M. Downing, Cincinnati, Ohio

Application April 8, 1933. Serial No. 665,230

6 Claims. (Cl. 221—47.3)

This invention relates to a dispensing device which is mainly intended for use in greasing an automobile or the like, but which may be used for other purposes, the general object of the invention being to provide means for forcing grease under pressure through a gun, with means for boosting the force with which the grease is ejected from the gun when desired, through means of a simple hand operated trigger.

Another object of the invention is to provide means whereby the same gun can be used for dispensing various kinds of greases, with means for cleaning the gun of the grease previously used, so that another kind of grease can be dispensed from the gun.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation with parts in section and parts broken away, showing one form of the gun.

Figure 2 is an end view of the receiving end of the gun.

Figure 3 is a fragmentary top plan view of the means for holding the sliding delivery pipe in its two positions.

Figure 4 is a view of the member at the front end of the gun, with the connections removed.

Figure 5 is a side or edge view of said member.

Figure 6 is a view similar to Figure 1, but showing a modification.

Figure 7 is a view looking toward the front or receiving end of the gun shown in Figure 6.

Figure 8 is a view of the rotary member at the front end of the gun shown in Figure 6.

Figure 9 is an edge view of said member.

Figure 10 is a diagrammatic view of the grease tanks and the air tank with their connections.

Figure 11 is a vertical sectional view through one of the grease tanks.

Figure 12 is a view of the coupling containing the screen for each grease tank.

Figure 13 is a view of the closure member at the front end of the gun shown in Figure 6.

Figure 14 is an edge view of said member.

Figure 15 is a view of a grease gauge and adapter.

Figure 16 is a view of the check valve.

Figure 17 is a view of the stem of the air valve.

Figure 18 is a view of the pivot member of the gun shown in Figure 6.

Figure 19 is a view of the cylinder insert used with the gun shown in Figure 1.

Figure 20 is a view of the stud used for connecting the booster piston rod with its piston.

Figure 21 is a view of the rod.

Figure 22 is a section on line 22—22 of Figure 10.

In these drawings, the numeral 1 indicates the body of the gun which is provided with a hand grip 2 to which a substantially L-shaped trigger 3 is pivoted, as at 4', so that the trigger can be depressed by the same hand that holds the gun.

The body is formed with a cylinder 4 in which is placed an insert barrel 5, the inner end of which forms one end of the cylinder 4. This barrel may be held in place in any suitable manner. Figures 1 and 19 show the insert 5 as provided with an annular groove 6 in which fits an annular flange 7 formed on the interior of the body 1. The outer end of the insert barrel is formed with an enlarged part 5', the outer end of which is threaded to receive the inner end of an elongated nut 8 which is held in place by the nut 9 and an intermediate part of the barrel 5 is formed with a chamber 10 which provides a valve seat 11 for a valve 12, shown in detail in Figure 16. This valve has a conical end for engaging the seat and with a wide annular groove 13 having the transverse ports 14 opening out thereto and these ports communicate with the bore 15 of the valve and which is formed with a shoulder against which one end of a spring 16 bears, the other end of which bears against the inner end of a sliding tube 17 which passes through the nut 8 and through a packing gland 18. A rod 19 is carried by the tube 17 and engages the cam slots 20 formed in the plates 21 attached to the outer end of the nut member 8. The slots 20 are so formed that they will hold the tube 17 either in its inner position or its outer position. When the tube is in its outer position, the spring 16 is not compressed so that the valve 12 will not engage its seat 11 so that material is free to pass through the barrel 5 into the chamber 10, through the ports 14 and the bore 15 of the valve and then flow through the tube 17. When said tube is in its innermost position, however, the spring 16 is compressed and thus the spring holds the valve 12 on its seat, but the valve can be forced from its seat by a certain amount of pressure exerted against the material in the barrel 5.

A passage 22 is formed in the body 1 and has its front end curving and in communication with the barrel 5 and the other end of the passage opens out through the inlet end of the gun.

A member 23 is suitably attached to the inlet end of the body and closes the cylinder 4 and has a number of radial passages 24 therein, the inner ends of which communicate with an extension 22' of the passage 22, said extension being formed in the member 23. A tube 25 is in communication with the outer end of each passage 24 and a valve 26 is connected to each tube 25 by a coupling 27. A flexible tube 28 connects each valve 26 with a supply tank, as will be hereinafter described, the material in each tank being under pressure so that by opening the valve 26 by means of its handle 26', the material will flow from the tank through the flexible tube 28, through the valve 26, pipe or tube 25 into a passage 24, according to which valve 26 is open, and then the material will pass through the passage 22, 22' into the barrel 5, through the valve 12 and then through the tube 17 and through the adapter which connects the tube 17 with the place where the material is to be deposited.

The member 23 is formed with a passage 29 through which passes a part of the stem or rod 30, the upper end of which is movably connected to the trigger 3. The lower end of the passage 29 is enlarged to form a cylinder for a piston valve 31 suitably connected to the lower end of the rod or stem 30 and the stem 30 and its valve 31 are normally held in raised position against a seat formed in the passage 29 by a spring 32 located in the lower part of the passage 29 and bearing against a plug 33 screwed into the lower end of the passage. A port 34 connects the passage 29 above the valve 31 with the cylinder 4 and a piston 35 is located in the cylinder 4 and is connected to a rod 36 by a headed stud 37 which has its stem passing through the piston and connected thereto by a nut 38. The head of the stud is slotted, as at 39 in Figure 20, to receive the grooved end 36' of the rod 36. A spring 40 normally holds the piston 35 and its rod 36 retracted, as shown in Figure 1.

A valve casing 41 has one end threaded to the member 23 opposite the inlet end of the passage 22, 22' and its other end is connected to a T coupling 42 which is connected to an air tank by a flexible tube 43 so that by turning the handle 44 of the valve, air will be introduced into the passage 22, 22' and by turning the handle in an opposite direction, the flow of air will be cut off to the member 23. A pipe 45 connects the coupling 42 to the lower end of the passage 29 in the member 23 so that by depressing the trigger 3, the rod 30 is moved to a position where the piston valve 31 can be moved below the pipe 45 so that air can flow from the pipe 45 through the lower part of the passage 29 and through the port 34 into the cylinder 4 which will force the piston 35 toward the discharge end of the gun and the rod 36 will exert pressure upon the material in the barrel 5 and thus force the material past the valve 12, when the same has been pressed upon its seat by placing the tube 17 in its innermost position. In this position of the parts, the gun will act as a high pressure one.

A valve casing 46 is threaded in an opening in the barrel 5 and is in communication with the chamber 10 and has a port 47 therein which is controlled by a screw valve or needle valve 48. This valve arrangement is used when the gun, with the parts in position to form a high pressure gun, and the part to which the gun is attached has become "frozen" so that the grease will not enter said part. Under these conditions, it might be impossible to remove the gun from the part to be greased and if this occurs, it is simply necessary to open the valve 48 to permit some of the grease to pass through the port 47 which will release the pressure and thus the gun can be removed from the fitting or part to which it has been attached.

In using this device for supplying grease to the differential or transmission of an automobile, for instance, the tube 17 is placed in its outermost position and that valve 26 is opened, the tube 28 of which is connected to the tank containing the desired lubricant. Thus the pressure on the lubricant in the tank will force the lubricant through the parts 26, 25, that passage 24 which is connected with the open valve 26, through the passage 22 and barrel 5, past the valve 12 and through the passages in said valve, through the tube 17 and any suitable form of adapter which has been placed in the grease receiving opening of the transmission or differential. If a higher pressure is necessary to force the grease into a part to which the gun is connected, greater than that supplied to the grease in the tank, then the trigger 3 is depressed, after the tube 17 has been placed in its innermost position, which presses the valve 12 upon its seat 11, so that the piston valve 31 is lowered and then air pressure will pass from the pipe 45 into the cylinder 4 and push the piston 35 toward the discharge end of the gun. This results in the rod 36 applying additional pressure to the lubricant in the gun, which forces the lubricant past the valve 12 and through the tube 17 into the part to be lubricated. After the part has been lubricated and it is desired to use the gun with a different kind of lubricant, the valve 26 is closed and the valve 44 opened so that air will flow through the passage 22 and the parts of the gun and will thus force the lubricant through the gun and thus clean the same so that the gun is now ready for use with another form of lubricant. Then the valve 26, which is connected to the tank containing the other type of lubricant is opened so that this lubricant will be supplied to the part to be lubricated.

The gun shown in Figure 6 differs from that shown in Figure 1 in that the part 50 to which the flexible members leading to the tank are connected through means of the tubes 51 is rotatably supported. This member 50 is rotatably arranged on a pivot pin 52 carried by the closure member 53 connected by the screws or bolts 54' to the inlet end of the body 1' of the gun. This member 53 is provided with the passage 29' for the valved rod 30' which is connected to the trigger 3' and has the port 34' for connecting the passage with the cylinder 4' of the gun, these parts being substantially the same as in the first form of the invention. This part 53 also is formed with the passage 54 which communicates with the passage 22' of the gun and the screws 54' enter the threaded holes 56 in said member 53. The pivot member 52 is formed with a transverse opening 57 which forms a part of the passage 29' and with a bore 58 which extends from the opening 57 through the outer end of the member. This outer part is threaded to receive the nuts and washer shown generally at 59, for holding the member 50 thereon and annular cup-shaped washers 60 are used to form an air-tight joint between the member 50 and the pivot member 52 to prevent air leaking between the parts. The member 50 is formed with a number of grease passages 61, each of which receives a tube 51 and each passage 61 will communicate with the port or passage 55 when the member 50 is turned to place a passage 61 opposite said passage 55. Thus by turning this member 50, any desired passage 61 can be placed in communication with the passage 22' of the gun, so that a different lubricant tank can be connected with the gun according to the type of lubricant desired to be used. Washers 62, one of which is preferably a cup-washer, are placed in the inner end of each passage 61 and are engaged by a spring 63 in each passage. The outer end of the pivot member 52 is connected by a flexible member to the compressed air tank and radial air passages 64 are formed in the member 50 and have their inner ends in communication with the bore of the member 52 and their outer ends are in communication with the chambers 65 formed in the member 50, each chamber being so positioned that it will register with the passage 55 in the member 53 when said member 50 is turned to place a chamber 65 opposite the passage 55. Each chamber 65 has a washer 66 in its inner end and a spring 67 has one end bearing against the washer and its other end against a plug 68 threaded in the outer end of the chamber 65. A bracket 69 is connected with a part of the periphery of the member 53 and carries a spring pressed stem 70 having a knob 71 at one end and its other end pointed to engage in any one of a plurality of recesses 72 formed in the member 50. Thus by drawing the stem 70 outwardly to release its inner end from the notch 72, the member 50 can be adjusted to place any one of the lubricant chambers 61 or any one of the air chambers 65 opposite the passage 55 to supply lubricant or air to the passage 22' of the gun.

This modified form of the device is used in the same manner as the first form, but the member 50 must be rotated to place the passage 61 therein which is in communication with the tank containing the desired lubricant, opposite the passage 55 in member 53. Then a valve similar to 26 and connected to said tube 51 which is in communication with the passage 61 which is opposite the passage 22' and passage 55 is opened so that lubricant will pass from the tank and its connection and the valve, through the tube 51, passage 61, passages 55 and 22' into the gun. After the proper amount of lubricant has been supplied, the member 50 is turned to place one of the air chambers 65 opposite the passage 55 so that air will flow from the supply through the member 52, the passage 64 and said chamber 65, through the passages 55 and 22' into the gun to remove the grease therefrom. Then the member 50 can be adjusted to another position to place another passage 61 opposite the passage 55 to supply another kind of grease to the gun.

The booster mechanism is operated in the same manner as in the first form of the device, excepting the air flows through the member 52 into the passage 29' and, if the valve on the rod 30' is open, the air will pass through the port 34' into the cylinder 4'. In both forms of the invention, a vent 73 is formed in the body for preventing the air in the cylinder from interfering with the movement of the piston.

Figure 15 shows an adapter which may be used with the invention, this adapter comprising a pipe 74 having a pressure gauge 75 associated therewith, a valve 76 and nozzle 77, but it will, of course, be understood that various kinds of adapters can be used with the gun, such as alemite and Zerk adapters and these adapters can be connected with the gun by flexible members of any suitable type.

Figure 10 shows the air pressure tank at 78 and the lubricant containing tanks at 79, the upper ends of the tanks 79 being connected to the upper end of the tank 78 by a pipe 80 with the connections between the pipe 80 and said tanks 79 containing pressure reducers 81. However, if all the tanks are to contain the same pressure, these reducers are not necessary. A valve 82 is placed in the pipe 80 where it joins the tank 78 and each tank contains a pressure gauge 83. Air can be supplied to the tank 78 from any suitable source through the conduit 84.

Each tank 79 has a follower 85 therein separating the air from the lubricant and the outlet 86 to each tank 79 contains a valve 87 and a screen 88, as shown more particularly in Figure 12. The pipes 28' lead from the tanks 78 and 79 to the coupling 89 and from this coupling the pipes 28'' pass through the flexible tubing 90 to the coupling 91 to which the pipes 28 and 43 are connected. In cold weather, the tanks 79 and the tank 78 should be heated by suitable means so that the lubricant will run freely and the heated air will clean the gun more readily than if cold air is used.

If desired, the lubricant in the various tanks can be colored in different colors so as to facilitate changing from one kind of lubricant to another.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:

1. A device of the class described comprising a body including a cylinder, a barrel and a passage opening out into the barrel in front of the cylinder, means for connecting the passage to a supply of lubricant or other material under pressure, a valve for controlling the flow of material from the supply through the passage into the barrel, a valve in the barrel, a spring engaging the valve, means for applying pressure to the spring to hold the valve on its seat, a piston in the cylinder, a rod connected to the piston and entering the barrel at the rear of the discharge end of the passage, a supply of compressed fluid connected with the cylinder and manually operated means for controlling the flow of compressed fluid to the cylinder such means, when in open position, permitting the fluid to enter the cylinder to force the piston forwardly to cause its rod to apply additional pressure to the material in the barrel.

2. A device of the class described comprising a gun having a cylinder therein and a barrel, said gun having a passage discharging into the barrel in front of the cylinder, means for connecting the passage to a source of material under pressure, a piston in the cylinder, a rod connected with the piston and entering the barrel in rear of the discharge end of the passage, a conduit connected with a compressed fluid supply and discharging into the cylinder to operate the piston, a valve in the conduit, a spring for normally holding the valve in position closing the conduit, a trigger pivoted to the gun for opening the valve, a second valve engaging a seat in the barrel adjacent the discharge end thereof, a sliding tube forming a continuation of the barrel, a spring between the tube and the second mentioned valve and means for adjusting the tube from an outer position to an inner position, the tube, when in its inner position, compressing the spring for holding the second mentioned valve upon its seat, said second mentioned valve opening under the pressure exerted on the material in the barrel by the operation of the piston and its rod.

3. A device of the class described comprising a gun having a cylinder therein and a barrel, said gun having a passage discharging into the barrel in front of the cylinder, means for connecting the passage to a source of material under pressure, a piston in the cylinder, a rod connected with the piston and entering the barrel in rear of the discharge end of the passage, a conduit connected with a compressed fluid supply and discharging into the cylinder to operate the piston, a valve in the conduit, a spring for normally holding the valve in position closing the conduit, a trigger pivoted to the gun for opening the valve, a second valve engaging a seat in the barrel adjacent the discharge end thereof, a sliding tube forming a continuation of the barrel, a spring between the tube and the second mentioned valve, means for adjusting the tube from an outer position to an inner position, the tube, when in its inner position, compressing the spring for holding the second mentioned valve upon its seat, said second mentioned valve opening under the pressure exerted on the material in the barrel by the operation of the piston and its rod and a valve for relieving the pressure in the barrel when desired.

4. A device of the class described comprising a gun having a cylinder therein, a barrel connected with the cylinder and said gun having a supply passage discharging into the barrel in front of the cylinder, a piston in the cylinder, a rod connected therewith and entering the barrel in rear of the discharge of the passage, a spring for normally holding the piston in inoperative position, a conduit leading from a supply of compressed fluid into the cylinder, a valve for normally holding the conduit closed, a trigger on the gun for opening the valve to permit the fluid to force the piston and its rod forwardly to exert additional pressure on the material in the barrel, material containing tanks, means for holding the material under pressure, flexible tubes leading from said tanks, means for connecting any one of said tubes to the passage in the gun and valve controlled means for controlling the flow of material from said tube into said passage.

5. A device of the class described comprising a gun having a cylinder therein, a barrel in communication with the cylinder and said gun having a supply passage discharging into the barrel in front of the cylinder, a valve in the discharge end of the barrel, a spring engaging the valve, means for regulating the spring to press the valve upon its seat and to permit the valve to remain off the seat, a piston in the cylinder, a rod connected with the piston and entering the barrel, a fluid conduit connecting the cylinder with a source of compressed fluid, a manually controlled valve for controlling the flow of fluid through the conduit into the cylinder, valve controlled means for connecting the passage to a supply of lubricant or other material under pressure and means for forcing fluid through the passage and the barrel to remove material therefrom.

6. A device of the class described comprising a gun having a barrel, a passage discharging into the barrel, a plurality of material tanks, each containing a different kind of material, conduits leading from the tanks, valve means connecting the conduits with the gun, means whereby any desired conduit can be connected with the passage in the gun, a fluid tank, means for connecting the same with the material tanks to place the material in said tanks under pressure, a conduit leading from the fluid tank to the gun, and valve controlled means for connecting the conduit to the passage in the gun to clean the passage and the barrel of material, a cylinder in the gun, a piston therein, a rod connected with the piston and entering the barrel and manually controlled means for connecting the conduit from the fluid tank with the cylinder to force the piston therein forwardly to place the material in the barrel under additional pressure, a valve in the barrel, a spring engaging the same, a tube forming a continuation of the barrel, means for adjusting the tube in the barrel for placing the spring under pressure or removing pressure from the spring when the tube is moved outwardly, the valve being moved to closed position when pressure is applied to the spring and a release valve connected with the barrel which, when in open position, relieves pressure from the material in the barrel.

HAROLD N. AYER.
JOSEPH M. DOWNING.